(12) United States Patent
Sugiura et al.

(10) Patent No.: US 6,701,310 B1
(45) Date of Patent: Mar. 2, 2004

(54) INFORMATION SEARCH DEVICE AND INFORMATION SEARCH METHOD USING TOPIC-CENTRIC QUERY ROUTING

(75) Inventors: Atsushi Sugiura, Tokyo (JP); Oren Etzioni, Seattle, WA (US)

(73) Assignees: NEC Corporation, Tokyo (JP); University of Washington, Seattle, WA (US)

( * ) Notice: Subject to any disclaimer, the term of this patent is extended or adjusted under 35 U.S.C. 154(b) by 0 days.

(21) Appl. No.: 09/569,305

(22) Filed: May 11, 2000

Related U.S. Application Data

(60) Provisional application No. 60/160,718, filed on Nov. 22, 1999.

(51) Int. Cl.[7] .............................. G06F 17/30; G06F 7/00
(52) U.S. Cl. ....................... 707/5; 707/1; 707/3; 707/4; 707/6; 707/10; 707/102; 707/104.1; 715/501.1; 715/513; 709/219; 709/217
(58) Field of Search .................... 707/1–10, 100–104.1, 707/200–205, 500.1, 501.1, 511–513, 529–532; 709/203–228; 725/109; 706/12; 345/721, 781, 783, 762, 835, 968; 715/501.1, 511–513

(56) References Cited

U.S. PATENT DOCUMENTS

| | | | | |
|---|---|---|---|---|
| 5,913,215 A | * | 6/1999 | Rubinstein et al. | 707/10 |
| 5,920,854 A | * | 7/1999 | Kirsch et al. | 705/2 |
| 6,070,157 A | * | 5/2000 | Jacobson et al. | 707/1 |
| 6,094,649 A | * | 7/2000 | Bowen et al. | 707/3 |
| 6,101,491 A | * | 8/2000 | Woods | 707/2 |
| 6,122,647 A | * | 9/2000 | Horowitz et al. | 707/3 |
| 6,128,613 A | * | 10/2000 | Wong et al. | 707/100 |
| 6,167,397 A | * | 12/2000 | Jacobson et al. | 707/5 |
| 6,253,198 B1 | * | 6/2001 | Perkins | 707/10 |
| 6,256,623 B1 | * | 7/2001 | Jones | 707/10 |
| 6,298,344 B1 | * | 10/2001 | Inaba et al. | 345/720 |
| 6,336,117 B1 | * | 1/2002 | Massarani | 707/100 |
| 6,370,527 B1 | * | 4/2002 | Singhal | 707/6 |

FOREIGN PATENT DOCUMENTS

| | | | | |
|---|---|---|---|---|
| EP | 0889419 | * | 1/1998 | 17/30 |

OTHER PUBLICATIONS

Selberg, E. et al., "Multi–Engine Search and Comparison Using the MetaCrawler," *World Wide Web Journal*, Fourth International World Wide Web Conference Proceedings, pp. 195–208.

Xu, J et al., "Effective Retrieval with Distributed Collections," Proceedings of the 21$^{st}$ Annual International ACM SIGIR Conference on Research and Development in Information Retrieval, ed. By Croft, W. B., et al., Aug. 24–28, 1988, pp. 112–120, Association for Computing Machinery, Inc.

* cited by examiner

*Primary Examiner*—Srirama Channavajjala
(74) *Attorney, Agent, or Firm*—Foley & Lardner

(57) ABSTRACT

An information search device capable of selecting topic search engines (i.e., search engines that focus on specific topics) that are appropriate to a user's search keywords when searching the Web on the Internet. Terms having relevance to each topic search engine are collected from, for example, the Web, and a DB selection index for selecting search engines is produced in advance by an index generator. When a search keyword is supplied from a user, terms having relevance to the search keyword are acquired from a general-purpose Web search engine by means of a query expansion unit. The thus-acquired terms are matched with terms stored in the DB selection index, and topic search engines having a high incidence of matching are presented to the user.

9 Claims, 8 Drawing Sheets

| URL of search engine | Relevant terms | Degree of importance |
|---|---|---|
| $E_1$ | $S_{11}$ | $W_{11}$ |
| | $S_{12}$ | $W_{12}$ |
| | ... | ... |
| $E_2$ | $S_{21}$ | $W_{21}$ |
| | $S_{22}$ | $W_{22}$ |
| | ... | ... |
| ... | | |
| $E_n$ | $S_{n1}$ | $W_{n1}$ |
| | $S_{n2}$ | $W_{n2}$ |
| | ... | ... |

FIG. 3

| Group ID | Expanded term | Occurrence |
|---|---|---|
| $G_1$ | $X_{11}$ | $C_{11}$ |
| | $X_{12}$ | $C_{12}$ |
| | ... | ... |
| $G_2$ | $X_{21}$ | $C_{21}$ |
| | $X_{22}$ | $C_{22}$ |
| | ... | ... |
| ... | | |
| $G_d$ | $X_{d1}$ | $C_{d1}$ |
| | $X_{d2}$ | $C_{d2}$ |
| | ... | ... |

FIG. 6

| Group ID | Reference character string |
|---|---|
| $G_1$ | $U_1$ |
| $G_2$ | $U_2$ |
| ... | ... |
| $G_d$ | $U_d$ |

FIG. 7

| Group ID | Expanded term | Occurrence |
|---|---|---|
| G | object | 6 |
| | oriented | 6 |
| | programming | 9 |
| | python | 15 |
| | scripting | 4 |
| | with | 2 |
| | home | 1 |
| | page | 2 |
| | an | 1 |

FIG. 10

INFORMATION SEARCH DEVICE AND INFORMATION SEARCH METHOD USING TOPIC-CENTRIC QUERY ROUTING

This application claims the benefit of Provisional application No. 60/166,718, filed Nov. 22, 1999.

BACKGROUND OF THE INVENTION

1. Field of the Invention

The present invention relates to searching or retrieving for information on the Internet, and in particular, to an information search device and information search method for acquiring information from a plurality of search engines existing on the WWW (World Wide Web, hereinbelow referred to as the "Web") on the Internet.

2. Description of the Related Art

A variety of information search engines (hereinbelow simply referred to as "search engines") exist on the WWW. In search engines such as Yahoo!—(http://www.yahoo.com) and AltaVista (http://www.altavista.com), a database of the URLs (Uniform Resource Locators) of Web pages existing on the Web is constructed to allow the user to search for a Web page. Yahoo! and AltaVista are general-purpose search engines directed to Web pages on various topics and categories, but there are also search engines that focus on specific topics (i.e., topic search engines). For example, Amazon.com (http://www.amazon.com) has a database directed exclusively to books for searching for books.

When searching the WWW by means of a search engine, users themselves typically select the search engine according to their purpose and search for information by submitting search keywords to the search engine. In other words, normally, a single search engine is used with each search. In this case, "search keywords" are keywords that are submitted when using a search engine to search for information.

In contrast, there is also a method known as "meta-search" that employs multiple search engines present on the Web (for example, Selberg, E. and Etzioni, O. "Multi-Service Search and Comparison Using the MetaCrawler." in Proceedings of the 4$^{th}$ International World Wide Web Conference, 1994). In a meta-search, the search keywords submitted by the user are sent to a plurality of search engines, and all search results obtained from the search engines are presented to the user organized in a single report. When using single search engine, a user must search with another search engine if the necessary information is not found by a particular search engine. In other words, the user must switch from search engine to search engine submitting the search keywords any number of times until the necessary information is found. A meta-search eliminates this need for repetitive operations.

Distributed information retrieval methods have been proposed for selecting information appropriate to a query from a plurality of information sources (for example, Xu, J. and Callan, J., "Effective Retrieval with Distributed Collections," in Proceedings of the 21$^{st}$ Annual International ACM STGTR Conference on Research and Development in Information Retrieval, pp. 112–120, 1998). According to such a method, a query is routed to only the databases of selected information source, and an improvement in the speed of the search process can therefore be expected. To select an appropriate database, a database (DB) selection index is first produced using keywords contained in each individual database among distributed databases and the frequencies of the keywords.

When using a single search engine, users must select the search engine according to the desired information. If users wish to get information on a recently published book, for example, they must select a book search engine, and if they wish to find a place to stay, they must select a hotel search engine. However, it is a burdensome task for users themselves to select the appropriate search service for each piece of required information.

A method can be considered by which search keywords are sent to all known search engines by the meta-search method, but sending the search keywords to all search services is impossible from a practical standpoint if there is a large number of search engines due to the problem of processing speed and the burden placed on the network. A current meta-search normally uses on the order of ten search engines, but if the number of search engines reaches, for example, a few thousand, the conventional meta-search method becomes unrealistic.

Appropriate search engines must therefore be selected according to the user's search keywords. However, the database selection method in distributed information retrieval of the prior art presupposes that all data that are contained in the databases of each information source can be accessed to produce a database selection index. If the information sources are search engines on the Web, however, the entire contents of the databases of the search engines is generally inaccessible, and this prevents the use of the database selection method in the distributed information retrieval of the prior art.

SUMMARY OF THE INVENTION

It is an object of the present invention to realize an information search device and information search method that produce an index (hereinbelow referred to as a "DB selection index") for selecting search engines from search engines existing on the Web and that select a search engine that is appropriate to a user's search keyword.

In more concrete terms, if, for example, the user's search keyword is "python," the object of the present invention is to present the user with results such as those shown in FIG. 1. "Python" is of course the name of one variety of snake, but it is also the name of a script-type object-oriented programming language. If the search keywords are related to multiple topics in this way, the search engine selection results are shown for each topic, and moreover, phrases explaining the topics are added. In the case shown in FIG. 1, the phrase "Object oriented programming with python" is added for "python" as an object-oriented programming language, and "Object-oriented Information Source" and "Scripting Database" are listed as the search engines. For "python" as the reptile snake, on the other hand, the phrases "snake python" is added, and "Reptile Search" and "Snake Information" are listed as search engines. The user selects the choice that matches his or her intent to enable actual submission of the search keyword to the selected search engine. In the example shown in the figure, the user can send the search keyword to the selected search engine by checking the check box displayed next to the search engine that is to be selected and clicking on the button "Send Query."

The search keywords may also be sent directly to each of the topic search engines (i.e., search engines that focus on specific topics) and the search result may be obtained without presenting the user with a list of topic search engines that may be relevant as shown in FIG. 1.

An information search device of the present invention that achieves the above-described objects is preferably provided with: (i) a relevant term collector for collecting terms describing the topics or content handled by a search engine;

(ii) an index generator for producing a DB selection index from the collected relevant terms; (iii) a DB selection index that is stored inside a storage device; (iv) a query expansion unit for obtaining a term relevant to a search keyword submitted by the user from a general-purpose search engine; (v) an expanded term storage unit for storing a term obtained by the query expansion unit; and (vi) an engine selector for selecting a search engine based on the information that is stored in the expanded term storage unit and the DB selection index.

Here, the query expansion unit preferably obtains a term relevant to the search keyword from the search result obtained by sending the search keyword submitted by the user to a general-purpose Web search engine.

Preferably, the information search device of the present invention is further provided with: (vii) a reference character string storage unit for a storing character string in a document obtained from a general-purpose search engine by the query expansion unit; and (viii) a phrase generator for generating a phrase that explains a topic that is relevant to the search keyword based on information stored in the reference character string storage unit and the expanded term storage unit.

The process of performing an information search of the Web using the information search device of the present invention can be divided between an index generation phase for generating a DB selection index and a search engine selection phase for selecting a search engine appropriate for the search keyword submitted from a user using the DB selection index.

In the index generation phase, the relevant term collector first collects topics handled by search engines and terms relevant to the content of search engines from the Web pages of the search engines or from other Web pages having hyperlinks pointing to the search engine pages. Next, the index generator generates a DB selection index from the terms collected by the relevant term collector and their frequencies, and stores this index in a DB selection index storage unit (typically, a storage device).

In the search engine selection phase, in the query expansion unit, a term relevant to a search keyword submitted from the user is first acquired from, for example, a general-purpose search engine. This process is performed because only a limited number of terms are collected in the relevant term collector, and the use of only the search keyword submitted by the user usually results in no matches at all with terms registered in the DB selection index. Terms acquired by the query expansion unit are stored in the expanded term storage unit. Character strings contained in the search results obtained for the query expansion process from the general-purpose search engine are stored in the reference character string storage unit as necessary.

After the query expansion process, one or more search engines are selected in the engine selector based on the information that is stored in the DB selection index and the expanded term storage unit. In addition, the phrase generator may generate phrases that explain the topics relevant to the search keywords that were submitted by the user, and present these phrases to the user together with the search engines that were selected in the engine selector.

The above and other objects, features, and advantages of the present invention will become apparent from the following description based on the accompanying drawings which illustrate examples of a preferred embodiment of the present invention.

BRIEF DESCRIPTION OF THE DRAWINGS

FIG. 3 is an explanatory view of data that are stored in the DB selection index;

FIG. 6 is an explanatory view of data that are stored in the expanded term storage unit;

FIG. 7 is an explanatory view of data that are stored in the reference character string storage unit;

FIG. 10 shows an example of data that are stored in the relevant term storage unit.

DESCRIPTION OF THE PREFERRED EMBODIMENTS

Figure 2:
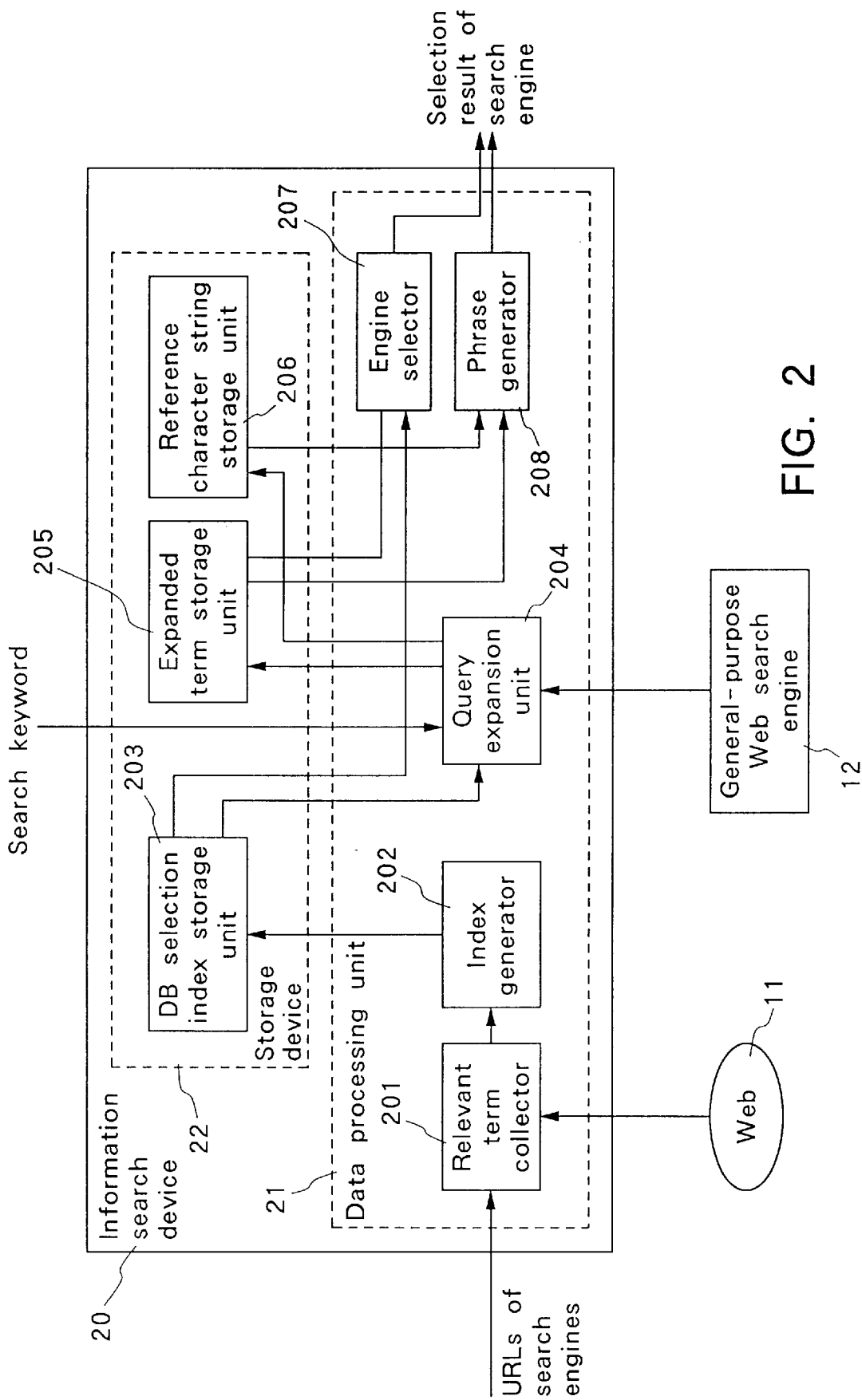
FIG. 2 is a block diagram showing the configuration of the information search device according to an embodiment of the present invention.

Referring to FIG. 2, information search device 20 according to an embodiment of the present invention is provided with: (i) relevant term collector 201 for collecting terms from Web 11 that describe topics or content handled by search engines; (ii) index generator 202 for producing a DB selection index from the collected relevant terms; (iii) DB selection index storage unit 203 for storing a DB selection index; (iv) query expansion unit 204 for obtaining terms relevant to search keywords submitted by the user from general-purpose Web search engine 12; (v) expanded term storage unit 205 for storing terms obtained by query expansion unit 204; (vi) reference character string storage unit 206 for storing character strings in documents obtained by query expansion unit 204 from general-purpose Web search engine 12; (vii) engine selector 207 for selecting one or more search engines based on information that is stored in expanded term storage unit 205 and DB selection index storage unit 203; and (viii) phrase generator 208 for generating phrases that explain topics relevant to the search keywords based on information that is stored in expanded term storage unit 204 and reference character string storage unit 206.

As hardware components, information search device 20 is equipped with data processing unit 21 that operates under the control of a program, and storage device 22 that stores information. Data processing unit 21 includes relevant term collector 201, index generator 202, query expansion unit 204, engine selector 207, and phrase generator 208; and storage device 22 includes DB selection index storage unit 203, expanded term storage unit 205, and reference character string storage unit 206. Data processing unit 21 is connected to the Internet, and terms that explain the topics or content handled by each search engine on the Internet are supplied to relevant term collector 201 from Web 11 on the Internet. In addition, general-purpose Web search engine 12 is a general-purpose search engine directed to Web pages on various topics or categories. For example, general-purpose Web search engine 12 may be a service that can be used via the Internet, as with the above-described Yahoo! and AltaVista, or may be configured as a local system that is not open to the Internet and that is usable only by information search device 20.

An information search using this information search device is next explained. As described in the foregoing explanation, the process of searching for information based on this invention can be broadly divided between an index generation phase for generating a DB selection index and a search engine selection phase for using the DB selection index to select search engines that are appropriate to search keywords submitted from the user. The operation of this information search device is described beginning with the index generation phase.

In the index generation phase, when the URL $E_i$ ($1 \leq i \leq n$) of a search engine is supplied, relevant term collector 201 collects the topics handled by that search engine and the relevant terms. In this specification, two methods will be described as the collection method. Either of the two methods described hereinbelow may be used as relevant term collector 201.

The first method employs Web document $P_i$ that corresponds to URL $E_i$, $P_i$ being a document obtained from Web 11 by URL $E_i$. Documents or phrases that explain the content of the search engine of URL $E_i$ can be expected to be contained in Web document $P_i$. In the first method, all terms contained in $P_i$ are considered to be terms relevant to the search engine.

The second method uses other Web documents that refer to URL $E_i$ (i.e., that have links pointing to $E_i$). It can be considered highly likely that phrases that explain the content of $E_i$ will be contained in Web documents that refer to URL $E_i$. In concrete terms, in the second method, a plurality of Web documents $P_{ij}$ ($1 \leq j \leq m$) that refer to $E_i$ are acquired, and all terms contained in all acquired documents are taken as terms relevant to the search engine. Alternatively, only the terms in Web documents $P_{ij}$ that are in the vicinity of links pointing to $E_i$ (for example, terms in the same line as links pointing to $E_i$) may be taken as relevant terms. Web documents $P_{ij}$ that refer to $E_i$ can be acquired by general-purpose Web search engines such as AltaVista and Infoseek (http://www.infoseek.com).

Index generator 202 next stores the relevant terms $S_{ik}$ ($1 \leq k \leq q$) collected by relevant term collector 201 as a DB selection index in DB selection index storage unit 203. The frequencies of all $S_{ik}$ are further counted, normalized, and stored in DB index storage unit 203 as degrees of importance $W_{ik}$. Degree of importance $W_{ik}$ is a value ranging from 0.0 to 1.0.

The above-described relevant term collection process and index generation process are carried out for all given search engine URLs $E_i$ ($1 \leq i \leq n$). As shown in FIG. 3, DB selection index storage unit 203 accordingly stores relevant terms and degrees of importance for each search engine as a DB selection index.

When the index generation phase is completed by the above-described procedures, the search engine selection phase begins for selecting search engines that are appropriate to the search keywords submitted by the user.

In the search engine selection phase, query expansion unit 204 first searches for general-purpose Web search engine 12 and acquires terms that are relevant to the search keywords submitted by the user.

The query expansion is here performed because there are cases in which few terms are collected in the above-described relevant term collection process, and cases in which there are no matches at all between search keywords submitted by the user and terms that have been registered in DB selection index storage unit 203. If, after acquiring terms that are relevant to search keywords through the query expansion, matches are made with terms that are registered in DB selection index storage unit 203, it can be expected that cases in which no matches at all occur between search keywords and terms registered in DB selection index storage unit 203 can be largely prevented.

Any method that can acquire terms relevant to the search keywords can be used as the query expansion method in query expansion unit 204. A more detailed explanation is next presented regarding the method in which search keywords are acquired from general-purpose Web search engine 12 (for example, AltaVista and Infoseek). Before explaining the operation of query expansion unit 204, however, an explanation is presented using FIG. 4 regarding the search results returned from general-purpose Web search engine 12 when a search keyword is sent to general-purpose Web search engine 12.

Figure 1:
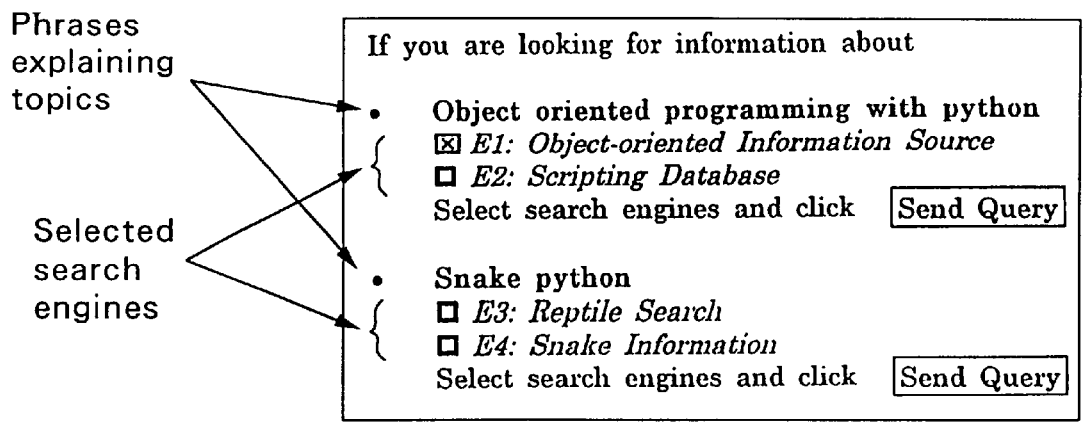
FIG. 1 shows an example of the search result output based on the present invention.
Figure 4:
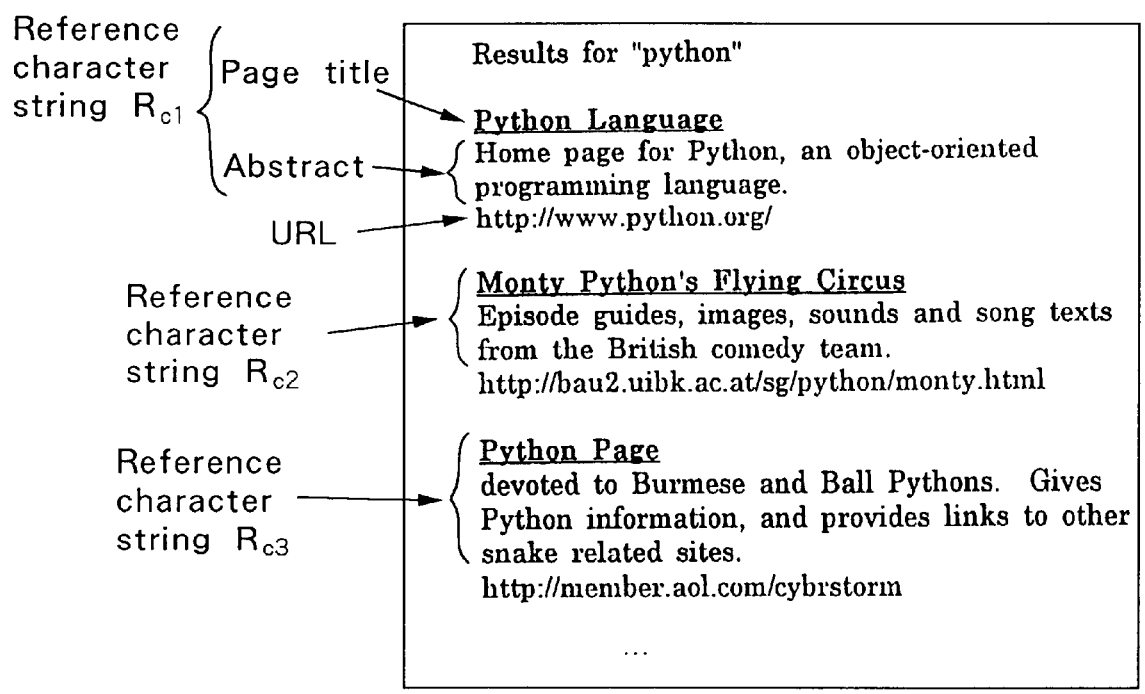
FIG. 4 shows an example of the search results returned from a general-purpose Web search engine.

As shown in FIG. 4, the search results from general-purpose Web search engine 12 typically contain a plurality of Web documents relevant to the query that was sent, and describe the page title, abstract, and URL of the Web page for each of these Web documents. In this specification, the title and abstract of the Web page are combined and referred to as a "reference character string." As shown in FIG. 4, a plurality of reference character strings are included in the search results obtained from general-purpose Web search engine 12.

Figure 5:
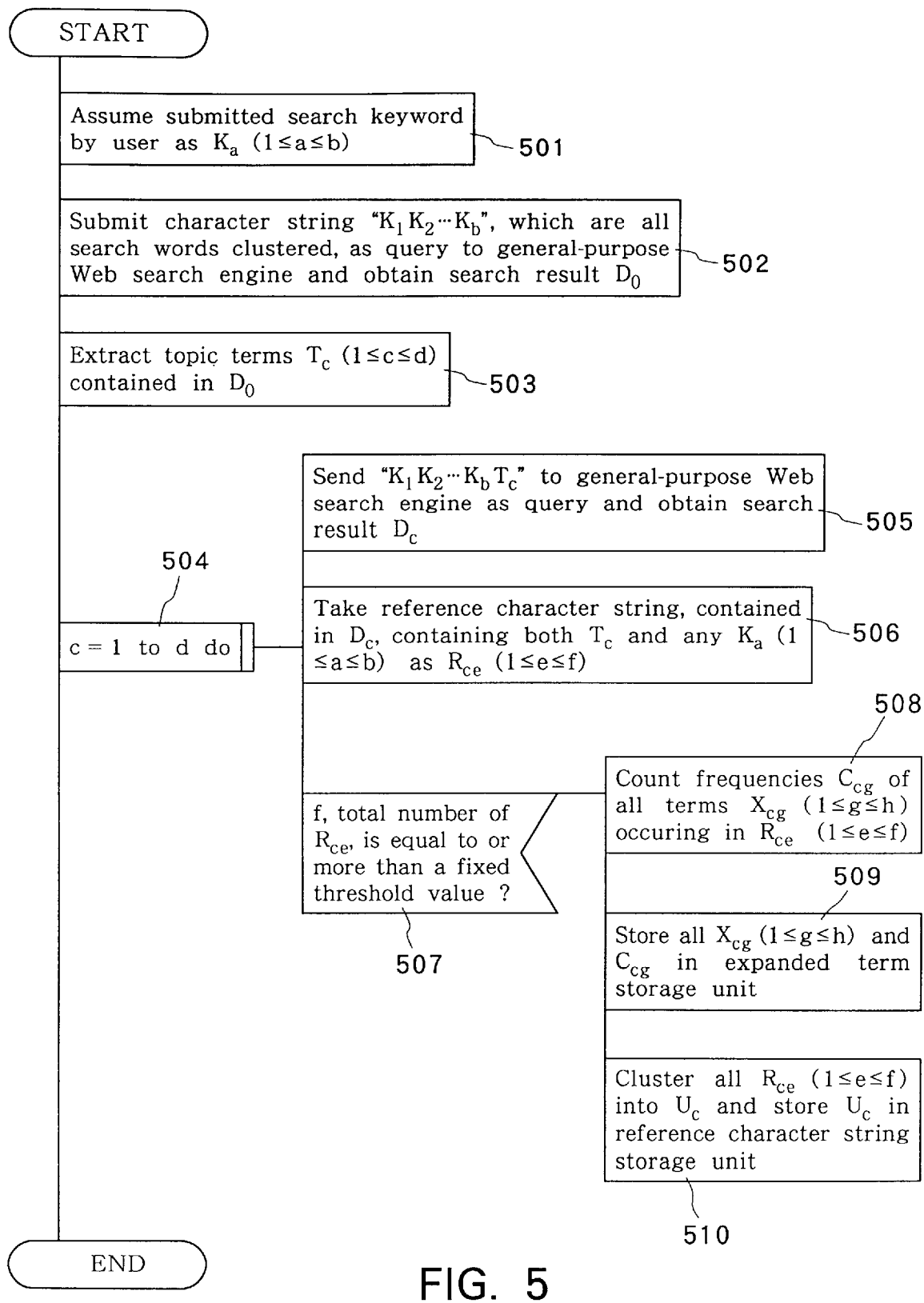
FIG. 5 is a PAD (Problem Analysis Diagram) for explaining the operation of the query expansion unit.

FIG. 5 is a PAD (Problem Analysis Diagram) for explaining the operation of query expansion unit 204. When search keywords $K_a$ ($1 \leq a \leq b$) are submitted from a user in Step 501, query expansion unit 204 submits character string "$K_1$ $K_2$ $K_b$", which are all search keywords clustered, as a query to general-purpose Web search engine 12 and obtains search results $D_0$ in Step 502. Next, topic terms $T_c$ ($1 \leq c \leq d$) contained in search results $D_0$ are extracted in Step 503. In this case, topic terms indicate relevant terms each having a degree of importance that is equal to or greater than a particular threshold value (for example, 0.8) in the DB selection index.

To check the relevance between search keywords supplied from the user and each topic term $T_c$, the processes of Steps 505 to 510 described below are performed for each topic term $T_c$ in Step 504.

First, in Step 505, "$K_1$ $K_2$ $K_b$ $T_c$" is sent to general-purpose Web search engine 12 as a query and search result $D_c$ is obtained. Reference character strings that contain both $T_c$ and any $K_a$ ($1 \leq a \leq b$) and are contained in search result $D_c$ are next taken as $R_{ce}$ ($1 \leq e \leq f$) in Step 506. Here, f is the number of co-occurrences of $T_c$ and $K_a$ in the same Web documents in search result $D_c$. In Step 507, topic term $T_c$ is seen to be relevant to search keyword $K_a$ that was submitted by the user if its frequency f is equal to or greater than a fixed threshold value, in which case, Steps 508 to 510 are carried out.

In Step 508, the frequencies $C_{cg}$ of all terms $X_{cg}$ ($1 \leq g \leq h$) occurring in reference character strings $R_{ce}$ ($1 \leq e \leq f$) are counted, and these results are stored in expanded term storage unit 205 in Step 503. In Step 510, all reference character strings $R_{ce}$ ($1 \leq e \leq f$) are clustered are made one character string $U_c$ and then stored in reference character string storage unit 206. Terms $X_{cg}$ ($1 \leq g \leq h$) obtained from query "$K_1$ $K_2$ $K_b$ $T_c$," however, are treated as one group. A unique group ID (identifier number) is attached for this purpose, and $X_{cg}$ and $C_{cg}$ are managed by each of those group ID. Accordingly, expanded terms and frequencies are stored corresponding to group ID in expanded term storage unit 205 as shown in FIG. 6. The $U_c$ corresponding to each group ID are similarly stored in reference character string storage unit 206 as shown in FIG. 7.

Figure 8:
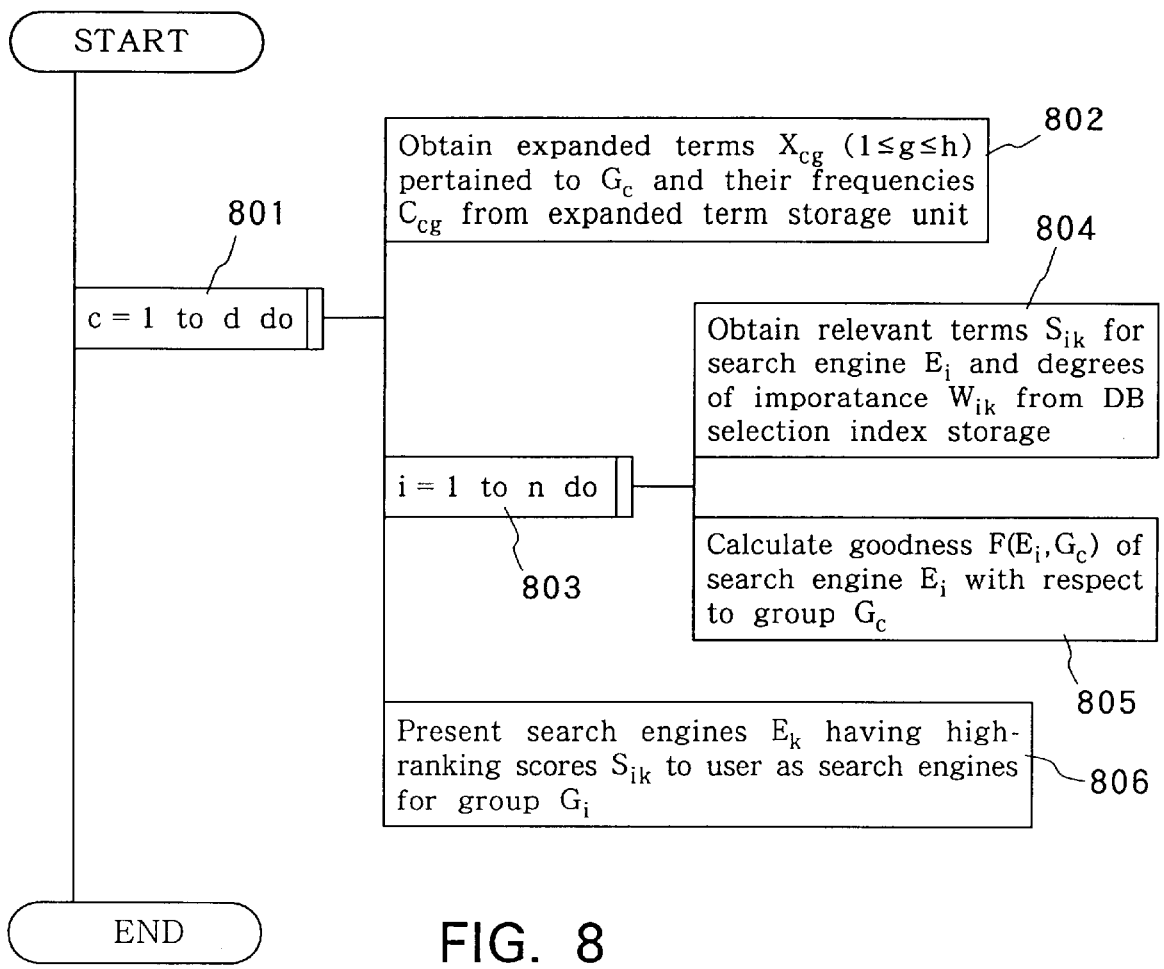
FIG. 8 is a PAD for explaining the operation of the engine selector.

Engine selector 207 next calculates the goodness-of-fit between the search engines and the expanded phrases. FIG. 8 is a PAD showing the operation of engine selector 207. The calculation of goodness is carried out in Step 801 for each group $G_c$ ($1 \leq c \leq d$) stored in expanded term storage unit 205. When calculating the goodness of search engine $E_i$ with respect to expanded phrase of group $G_c$, expanded terms $X_{cg}$ ($1 \leq g \leq h$) for $G_c$ and their frequencies $C_{cg}$ are first obtained from expanded term storage unit 205 in Step 802. Next, the relevant terms $S_{ik}$ ($1 \leq k \leq q$) of search engine $E_i$ and their degrees of importance $W_{ik}$ are obtained from DB selection index storage unit 203 in Step 804, and the goodness $F(E_i, G_c)$ of search engine $E_i$ with respect to group $G_c$ is calculated in Step 805 by means of the following equation:

$$F(E_i, G_c) = \sum_{k=1}^{q} \sum_{g=1}^{k} W_{ik} * C_{cg} * f(S_{ik}, X_{cg})$$

where f(x, y) is a function that is 1 when character strings x and y are equal and 0 when character strings x and y are not equal.

Engine selector 207 calculates the goodness of all search engines $E_i$ ($1 \leq i \leq n$) for each group $G_c$ ($1 \leq c \leq d$) in Step 803, and in Step 806 presents the search engines $E_k$ having high-ranking scores $S_{ik}$ to the user as the search engines for group $G_c$.

Figure 9:
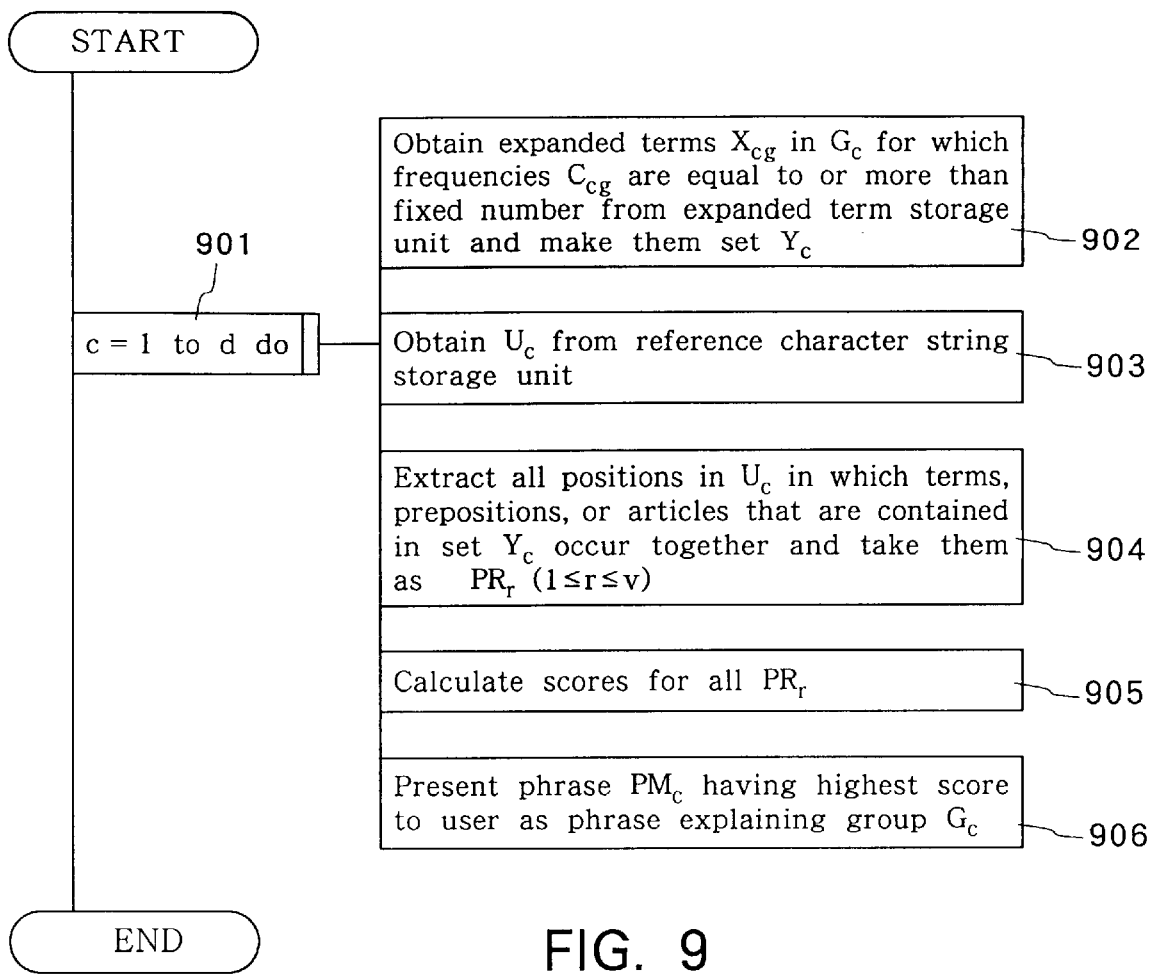
FIG. 9 is a PAD for explaining the operation of the phrase generator.

Independent of the processing of engine selector 207, phrase generator 208 produces phrases that explain the topics that are relevant to the search keywords that have been submitted by the user. FIG. 9 shows the processing of phrase generator 208 in this case. Essentially, phrase generator 208, repeats the following Steps 902 to 905 in Step 901 to produce phrases $PM_c$ that describe the content of the groups for each group $G_c$ ($1 \leq c \leq d$) that is stored in reference character string storage unit 206. Phrases $PM_c$ are extracted from reference character string $U_c$ by the following process.

Expanded terms $X_{cg}$ in group $G_c$ for which the frequency $C_{cg}$ is equal to or greater than a particular fixed number are first obtained from expanded term storage unit 205 and made them set $Y_c$ in Step 902. Reference character string $U_c$ is obtained in Step 903 from reference character string storage unit 206. All positions $PR_r$ ($1 \leq r \leq v$) in $U_c$ in which terms, prepositions, or articles that are contained in $Y_c$ occur together are extracted as $PM_c$ candidates in Step 904, and scores are calculated for each $PR_r$ in Step 905. The scores are calculated from the sums of the frequencies $C_{cg}$ of all $X_{cg}$ contained in $PR_r$. In Step 906, the phrase having the highest score is selected as phrase $PM_c$ that explains group $G_c$ and is presented to the user.

For example, reference character string U for a particular group G is "Object oriented programming with Python. Home page for Python, an object oriented scripting." and the expanded terms and frequencies for G are stored in the expanded term storage unit as shown in FIG. 10. If the position in which expanded terms having three or more occurrences continue is used as a phrase, the two phrases "Object oriented programming with Python" and "Python, an object oriented scripting" will be extracted as candidates. Although the frequencies of "with" and "an" do not attain 3 in this case, the inclusion of these words in the phrases is permitted because these words are a preposition and an article. The frequencies of the relevant terms "Object," "oriented," "programming," and "Python" for "Object oriented programming with Python," which is 8, 6, 9, and 15, respectively, are added to obtain 38. In the same way, the score for "Python, an object oriented scripting" is 33.

Accordingly, "Object oriented programming with Python" is selected as phrase PM that describes group G.

Explanation has been presented hereinabove regarding an information search device according to a preferable embodiment of the present invention, and as shown in FIG. 2, as hardware, this information search device 20 is provided with data processing device 21 that operates under the control of a program and storage device 22 for storing information. Accordingly, this information search device 20 can also be realized by providing a general-purpose computer system having a CPU (central processing unit) and main memory as data processing device 21 and an external storage device such as a hard disk device as storage device 22, and then by reading a computer program to the general-purpose computer system in order to realize the above-described information search and executing the program. This general-purpose computer system may further be provided with: an input device (such as a keyboard or mouse) for entering, for example, search keywords; a display device (such as a CRT) for displaying search results; a communication interface (such as a modem) for connecting to, for example, the Internet; and a reading device for reading a recording medium onto which a program has been recorded. The information search may then be executed by installing in a reading device a recording medium on which is stored a program for carrying out an information search as described hereinabove; reading the program from the recording medium and storing the program in a program storage area; and then executing this stored program by the central processing unit.

In the present invention as described hereinabove, search engines on the Web that are appropriate for search keywords that are submitted by a user can be presented because a DB selection index is generated using search engine pages and other Web pages having links pointing to search engines even in a case in which all data in databases of search engines is not accessible.

In addition, even when few terms are collected by the DB selection index generating method described herein, terms relevant to search keywords can be acquired using a query expansion method whereby, in most cases, appropriate search engines can be selected by matching these acquired terms and terms in the DB selection index.

Finally, in cases in which the search keywords may be relevant to a plurality of topics, a query expansion process is carried out and search engines selected for each topic which may be relevant. Moreover, when search keywords are relevant to a plurality of topics, phrases can be generated that describe these topics and the appropriate search engines can then be presented to the user by topic.

While a preferred embodiment of the present invention has been described using specific terms, such description is for illustrative purposes only, and it is to be understood that changes and variations may be made without departing from the spirit or scope of the following claims.

What is claimed is:

1. An information search device for selecting a search engine, comprising:
   a relevant term collector for collecting, from web pages having links pointing to topic search engines and from topic search engine pages, a relevant term that describes a topic and/or content that is handled by each search engine;
   an index generator for producing a search engine selection index from said collected relevant terms;
   a search engine selection index storage unit for storing said search engine selection index;

a query expansion unit for obtaining an expanded term that is relevant to a search keyword submitted by a user to a general purpose search engine;

an expanded term storage unit for storing the expanded term obtained by said query expansion unit; and an engine selector for calculating goodness-of-fit between said search keyword and each search engine based on information that is stored in said search engine selection index storage unit and said expanded term storage unit, and for selecting, based on said goodness-of-fit, a search engine that is relevant to said search keyword, wherein said goodness-of-fit is calculated by $$F(E_i, G_c) = \sum_{k=1}^{q} \sum_{g=1}^{k} W_{ik} * C_{cg} * f(S_{ic}, X_{cg})$$

where f(x,y) is a function that is 1 when character strings x and y are equal and 0 when character strings x and y are not equal, $E_i$ are search engines, $G_c$ are groups comprising search keywords associated with a topic, $W_{ik}$ are degrees of importance, $C_{cg}$ are frequencies of occurrence, $s_{ik}$ are relevant terms, and $x_{cg}$ are expanded terms.

2. An information search device according to claim 1, wherein said query expansion unit acquires the term that is relevant to a search keyword submitted by the user from a search result obtained by sending said search keyword to a general-purpose Web search engine.

3. An information search device according to claim 2, further comprising:

a reference character string storage unit for storing a character string in a document obtained as a search result from a general-purpose Web search engine when the search keyword submitted by the user is sent to said general-purpose Web search engine; and a phrase generator for generating a phrase that explains a topic that is relevant to said search keyword based on information stored in said reference character string storage unit and said expanded term storage unit.

4. An information search device according to claim 1, further comprising:

a reference character string storage unit for storing a character string in a document obtained as a search result from a general-purpose Web search engine when the search keywords submitted by the user is sent to said general-purpose Web search engine; and a phrase generator for generating a phrase that explains a topic that is relevant to said search keyword based on information stored in said reference character string storage unit and said expanded term storage unit.

5. An information search device according to claim 1, wherein said search engine selection index contains a relevant term for each search engine and a degree of importance for each relevant term, the degree of importance of each relevant term being determined according to the frequency of that relevant term.

6. An information search device according to claim 1, wherein said query expansion unit extracts a relevant term having a high degree of importance from relevant terms that are stored in said search engine selection index storage unit and acquires a term that is relevant to said search keyword by preferentially checking relevance between extracted terms and the search keyword that has been submitted by the user.

7. An information search method that presents to a user a topic search engine that is relevant to a search keyword that has been submitted by said user, comprising the steps of:

acquiring, for each topic search engine that is present on the Web, a term that is relevant to content of the topic search engine from a Web page of the topic search engine itself;

matching the term that is relevant to each topic search engine with the term that has been acquired by query expansion;

matching said acquired term with said search keyword; and presenting to the user a topic search engine corresponding to the term determined by matching to have high goodness-of-fit, wherein said goodness-of-fit is calculated by $$F(E_i, G_c) = \sum_{k=1}^{q} \sum_{g=1}^{k} W_{ik} * C_{cg} * f(S_{ic}, X_{cg})$$

where f(x,y) is a function that is 1 when character strings x and y are equal and 0 when character strings x and y are not equal, $E_i$ are search engines, $G_c$ are groups comprising search keywords associated with a topic, $W_{ik}$ are degrees of importance, $C_{cg}$ are frequencies of occurrence, $s_{ik}$ are relevant terms, and $x_{cg}$ are expanded terms.

8. An information search method that presents to a user a topic search engine that is relevant to a search keyword that has been submitted by said user, comprising the steps of:

acquiring a term that is relevant to content of a topic search engine that is present on the Web from another Web page that has a hyperlink pointing to that topic search engine;

acquiring a term that is relevant to said search keyword by means of query expansion;

matching said acquired term with said search keyword; and presenting to the user a topic search engine that corresponds to the term determined by matching to have high goodness-of-fit, wherein said goodness-of-fit is calculated by $$F(E_i, G_c) = \sum_{k=1}^{q} \sum_{g=1}^{k} W_{ik} * C_{cg} * f(S_{ic}, X_{cg})$$

where f(x,y) is a function that is 1 when character strings x and y are equal and 0 when character strings x and y are not equal, $E_i$ are search engines, $G_c$ are groups comprising search keywords associated with a topic, $W_{ik}$ are degrees of importance, $C_{cg}$ are frequencies of occurrence, $s_{ik}$ are relevant terms, and $x_{cg}$ are expanded terms.

9. An information search method, comprising the steps of:

sending a search keyword that has been submitted by a user to a general-purpose search engine;

extracting a phrase from information returned by the general-purpose search engine;

generating an index of search engines;

calculating a degree of importance of said extracted phrase in relation to the search keyword;

selecting a phrase having a highest degree of importance as a phrase that explains said search keyword;

matching a search engine from the index of search engines with the selected phrase; and presenting to said user the selected phrase together with the search engine,
wherein in the step of calculating a degree of importance, the degree of importance is based on the goodness-of-fit between the keyword and the search engine, said goodness of fit calculated by $$F(E_i, G_c) = \sum_{k=1}^{q} \sum_{g=1}^{k} W_{ik} * C_{cg} * f(S_{ic}, X_{cg})$$

where f(x,y) is a function that is 1 when character strings x and y are equal and 0 when character strings x and y are not equal, $E_i$ are search engines, $G_c$ are groups comprising search keywords associated with a topic, $W_{ik}$ are degrees of importance, $C_{cg}$ are frequencies of occurrence, $s_{ik}$ are relevant terms, and $x_{cg}$ are expanded terms.

* * * * *

UNITED STATES PATENT AND TRADEMARK OFFICE
CERTIFICATE OF CORRECTION

PATENT NO. : 6,701,310 B1
DATED : March 2, 2004
INVENTOR(S) : Atsushi Sugiura and Oren Etzioni It is certified that error appears in the above-identified patent and that said Letters Patent is hereby corrected as shown below:

<u>Title page, Item [54] and Column 1, lines 1-3,</u>
Title, change to read -- SEARCH ENGINE CALCULATING GOODNESS-OF-FIT BETWEEN SEARCH KEYWORD AND SEARCH ENGINE SELECTION INDEX --.

<u>Title page,</u>
Item [60], change Provisional application No. from "60/160,718" to -- 60/166,718 --, filed on Nov. 22, 1999.

Signed and Sealed this

Twenty-second Day of June, 2004

JON W. DUDAS
*Acting Director of the United States Patent and Trademark Office*